United States Patent
Berben et al.

(10) Patent No.: US 7,695,164 B2
(45) Date of Patent: Apr. 13, 2010

(54) ILLUMINATION SYSTEM FOR IMAGING ILLUMINATION WITH A HIGH LEVEL OF HOMOGENEITY

(75) Inventors: Dirk Berben, Taufkirchen (DE); Frank Jermann, Königsbrunn (DE)

(73) Assignee: Osram Gesellschaft mit Beschraenkter Haftung, Munich (DE)

( * ) Notice: Subject to any disclaimer, the term of this patent is extended or adjusted under 35 U.S.C. 154(b) by 179 days.

(21) Appl. No.: 11/805,001

(22) Filed: May 22, 2007

(65) Prior Publication Data
US 2007/0274068 A1    Nov. 29, 2007

(30) Foreign Application Priority Data
May 24, 2006   (DE) .................. 10 2006 024 462

(51) Int. Cl.
*F21V 3/04* (2006.01)
(52) U.S. Cl. ............ 362/307; 362/311.03; 362/311.06; 362/308; 362/84
(58) Field of Classification Search .................. 362/11, 362/231, 235, 307, 308, 311, 355, 311.01, 362/311.02, 311.03, 311.06, 311.09, 311.1, 362/84, 327–329, 293
See application file for complete search history.

(56) References Cited

U.S. PATENT DOCUMENTS

| 4,821,114 | A  | 4/1989  | Gebhardt |
| 5,515,136 | A  | 5/1996  | Nishio et al. |
| 6,630,801 | B2 | 10/2003 | Schuurmans |
| 6,995,355 | B2 * | 2/2006 | Rains et al. ................. 250/228 |
| 7,144,131 | B2 * | 12/2006 | Rains ......................... 362/231 |
| 7,220,021 | B2 * | 5/2007 | Wang et al. ................. 362/247 |

* cited by examiner

*Primary Examiner*—Thomas M Sember
(74) *Attorney, Agent, or Firm*—Cohen Pontani Lieberman & Pavane LLP

(57) ABSTRACT

An illumination system for imaging illumination having at least one compact light source. The illumination system comprises a reflector having a reflector contour, the light source being accommodated in the vicinity of the reflector contour. A compact diffusing medium is accommodated at the focal point of the reflector, the light from the light sources being directed substantially onto the diffusing medium and, from there, being diffused onto the reflector contour, with the result that the light leaving the reflector is emitted homogeneously.

11 Claims, 4 Drawing Sheets

ILLUMINATION SYSTEM FOR IMAGING ILLUMINATION WITH A HIGH LEVEL OF HOMOGENEITY

FIELD OF THE INVENTION

The invention is based on an illumination system for imaging illumination, having at least one compact light source, with a high level of homogeneity. Such illumination systems are of particular interest for use in stage construction or vehicle construction.

BACKGROUND OF THE INVENTION

U.S. Pat. No. 4,821,114 has disclosed an optical illumination system having a filter wheel and a white light source in the form of a lamp. In this case, blocking filters, such as absorption filters and dichroitic filters, for example, are used. They are inserted into the beam path of virtually point light sources such as xenon high-pressure discharge lamps. A continuous change in color is therefore only possible with a plurality of filter wheels and needs to be realized in a complex manner by mechanical means. The filter wheels are positioned one behind the other and rotated appropriately. The control is complex and the filters are very expensive.

Control for groups of LEDs is specified, for example, in U.S. Pat. Nos. 5,515,136 and 6,630,801. DE-Az 10 2005 041 319.6 has described a module in which a plurality of high-efficiency LEDs are combined on one printed circuit board. These are then imaged onto one point.

Imageable ultra-high power LEDs at present represent one of the greatest technical challenges. In addition to the production of white light, in particular the implementation of imageability plays an important role. Previous attempts have therefore proposed the superimposed imageability of a plurality of LEDs. However, this has various disadvantages. A relatively complex system which images a plurality of LEDs at the same time is cost-intensive since the optical arrangements need to be applied a plurality of times.

A quite different substantial disadvantage with the known solutions is the fact that white LEDs are used which are in the form of conversion LEDs. This means that a fluorescent layer converts the primarily emitted light from the LEDs partially or completely into longer-wave radiation. In the process, the phosphor needs to be applied in the direct vicinity of the chip. However, these phosphors are in principle more or less thermally sensitive. At junction temperatures beyond 150° C., all known phosphors display significant losses of efficiency owing to thermal quenching. Individual phosphors which are very suitable per se at room temperature are even considerably more sensitive. Overall, this results in reduced efficiency. Until now, there has been no sensible technical solution to this.

SUMMARY OF THE INVENTION

One object of the present invention is to provide an illumination system which ensures the possibility of imaging in a simple manner.

The novel solution finds a convincing way of implementing the separation between the light source and the phosphor.

The above-mentioned object and other objects are attained in accordance with one aspect of the present invention directed to an illumination system for imaging illumination having at least one compact light source. This light source may be an LED or a laser diode or miniature lamp. In this case, the illumination system comprises a reflector having a reflector contour, the light source being accommodated in the vicinity of the reflector contour, a compact diffusing medium being accommodated at the focal point of the reflector, the light from the light sources being directed substantially onto the diffusing medium and, from there, being diffused onto the reflector contour, with the result that the light leaving the reflector is emitted homogeneously.

In particular, each light source comprises a plurality of groups of similar light sources. In this case, the light sources may be LEDs, laser diodes or miniature lamps. Often, at least three to seven similar light sources are used. These may possibly also be arranged in groups, which are driven differently and electronically.

The light source is in this case usually colored, in particular emitting blue at the peak.

The illumination system preferably uses a compact diffusing medium, which has the shape of a sphere. The implementation of the sphere can take place by means of a drop. This drop can use a cast resin as the basic structure. An inert diffuser, in particular $Al_2O_3$ or $TiO_2$, advantageously in the form of particles dispersed in cast resin, can be used as the actual diffusing means in the diffusing medium. Particularly preferably, the diffusing medium now contains, in addition, one or more phosphors for converting the light emitted by the light source. However, in a simple embodiment the light source itself may also be white and may possibly contain the phosphor itself. The light source is then in particular a white LED or miniature lamp. In particular, it may be a ring-shaped miniature lamp.

The diffusing medium can be held in the reflector in various ways. The most elegant way is a solution in which the reflector is filled with a casting compound, the diffusing medium being placed in the casting compound.

Finally, the diffusing medium acts as a virtual light source in the reflector. Its volume therefore needs to be as small as possible, in any case less than 50 mm$^3$, preferably $\leqq 10$ mm$^3$.

BRIEF DESCRIPTION OF THE DRAWINGS

The invention will be explained in more detail below with reference to a plurality of exemplary embodiments. In the figures.

DETAILED DESCRIPTION OF THE DRAWINGS

Figure 1:
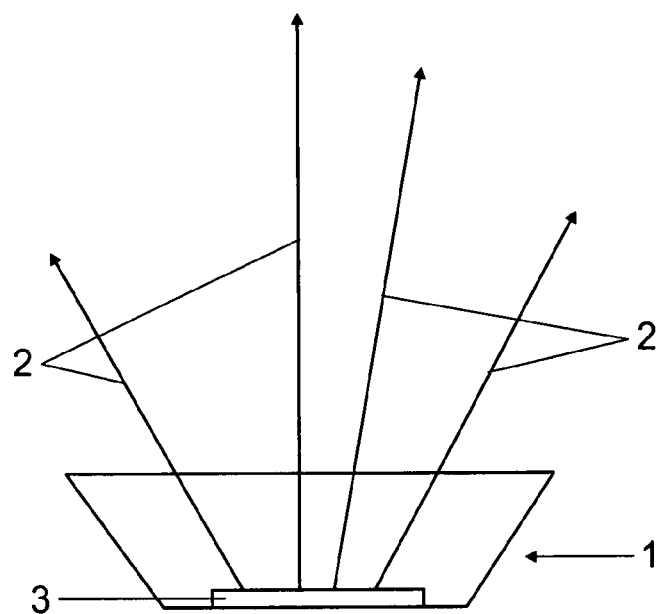
FIG. 1 shows the emission characteristic of a normal LED.

FIG. 1 shows the cosine emission characteristic of a normal LED 1. The beams 2 diverge from the chip 3 in all physical directions. The arrow length symbolizes the relative intensity.

Figure 2:
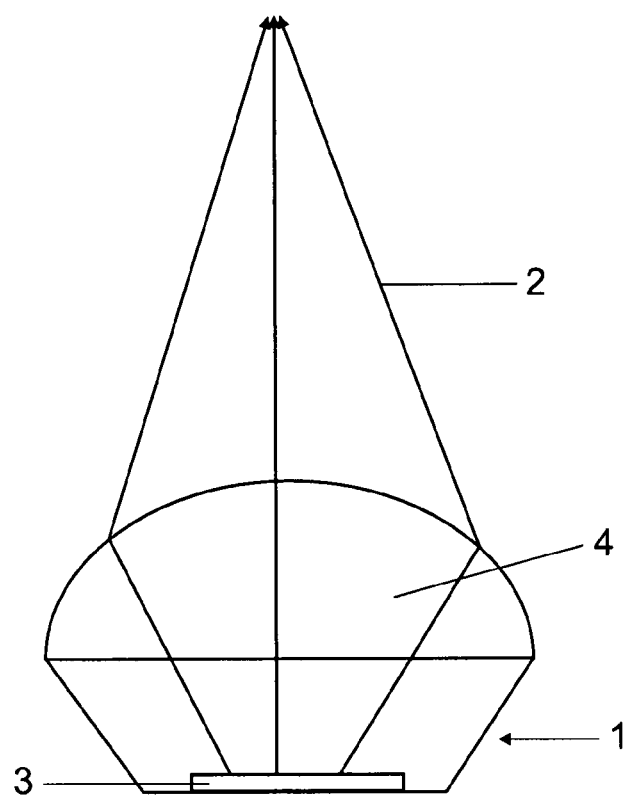
FIG. 2 shows the emission characteristic of an LED having a microlens.

FIG. 2 shows an LED 1 with a microlens 4 connected upstream, as is known per se. This has the object of focusing the light from the chip 3. Imaging onto a focused spot is therefore possible for an individual LED.

Figure 3:
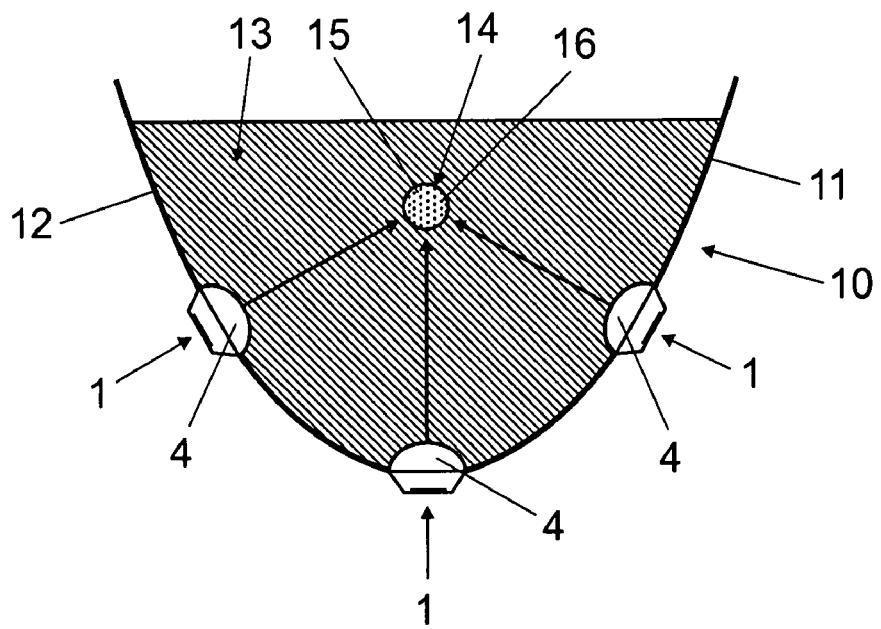
FIG. 3 shows an illumination system having a reflector, in cross section.

FIG. 3 shows, in cross section, an illumination system 10 having a plurality of LEDs 1 and having a reflector 11. This reflector has a contour 12, which is parabolic, for example. A plurality of LEDs with an imaging optical arrangement 4, for example a microlens, are positioned in the wall of the reflector contour 12. The reflector is filled with casting compound 13, as is known per se. A drop 14, which measures approximately 1 mm in diameter, is introduced as the diffusing means in the casting compound at the focal point of the reflector.

Figure 4:
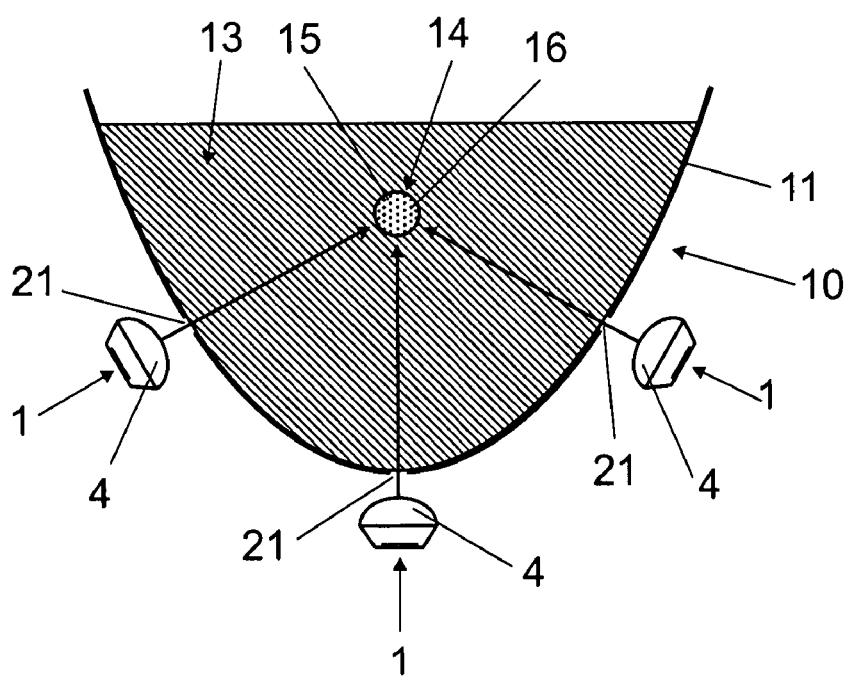
FIG. 4 shows an illumination system having a reflector, in cross section.

The LEDs can also be positioned outside of the reflector at a certain proximity thereto, as shown in FIG. 4; in each case only one opening 21 is required in the reflector in order to guide the light from an LED 1 up to the drop 14. This allows for simpler installation since there are no longer any problems with cooling and adjustment of the LEDs. In addition, the area in the contour which is subject to losses can be minimized.

The diffusing drop comprises a highly concentrated mixture of casting compound 15 such as epoxy resin and an inert diffuser. This inert diffuser is, for example, particles 16, which act as an inert diffuser, in particular $Al_2O_3$ or $TiO_2$ or the like. Any low-loss material with a sufficient sudden change in the refractive index and a suitable particle size is likewise in principle suitable for this purpose, for example YAG (undoped), $SiO_2$, all lamp phosphors. Only a pulverulent material with a white appearance is actually essential if its refractive index differs from the refractive index of the casting material. An alternative for implementing the inert diffuser is to implement the active drop as a plastic hybrid, i.e. to incorporate small particles of plastic having a relatively high refractive index in a casting compound having a low refractive index. Gas bubbles, for example air bubbles, in the casting material are likewise suitable as inert diffusers.

The diffusing medium is preferably spherical, but in the individual case it may also have another shape.

Figure 7:
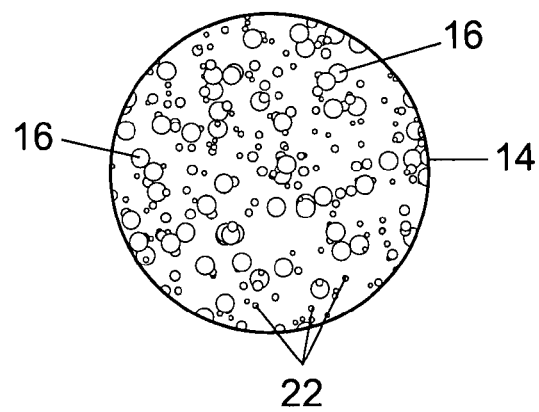
FIG. 7 shows a drop, in detail.

The diffusing drop in addition contains phosphor particles 22, see FIG. 7, such as YAG:Ce, nitrides, thiogallates, sulfides, siones or orthosilicates or chlorosilicates, alone or in a suitable combination. In the case of YAG:Ce, it is particularly advantageous if a diffusing means such as undoped YAG is dispensed with such that the YAG:Ce at the same time performs the diffusing. The LED may also be a UV-emitting LED, but a blue LED is preferred since its radiation has a less aggressive effect on the resin.

Preferably, the diffusing medium is spherical, but in the individual case it may also have another shape. Groups of blue LEDs are let into the wall of the reflector which are each provided with microlenses for outputting light. Their optical arrangement is set such that the respective individual chip is imaged onto the diffusing medium. The number of individual LEDs is finally only limited by the size of the reflector.

In order not to impair the efficiency of the reflector too severely, the usable area of the reflector should not be too severely limited by the LEDs. An acceptable value is below 20%, in particular from 1 to 5%.

The diffusing drop diffuses the light from all the LEDs, given the appropriate selection of the concentration of diffusing particles, virtually isotropically. In the end result, the diffusing drop then acts as a point white or else colored light source in the reflector.

For example, blue LEDs can be used for a colored light source which are only diffused using a pure diffusing medium.

Driving of the LEDs is in this case preferably carried out as one group. However, it may also be carried out in various groups. This makes it possible to directly select any desired color locus, as is known per se for LEDs. There are many known methods for achieving this, for example as described in U.S. Pat. No. 6,630,801.

Figure 5:
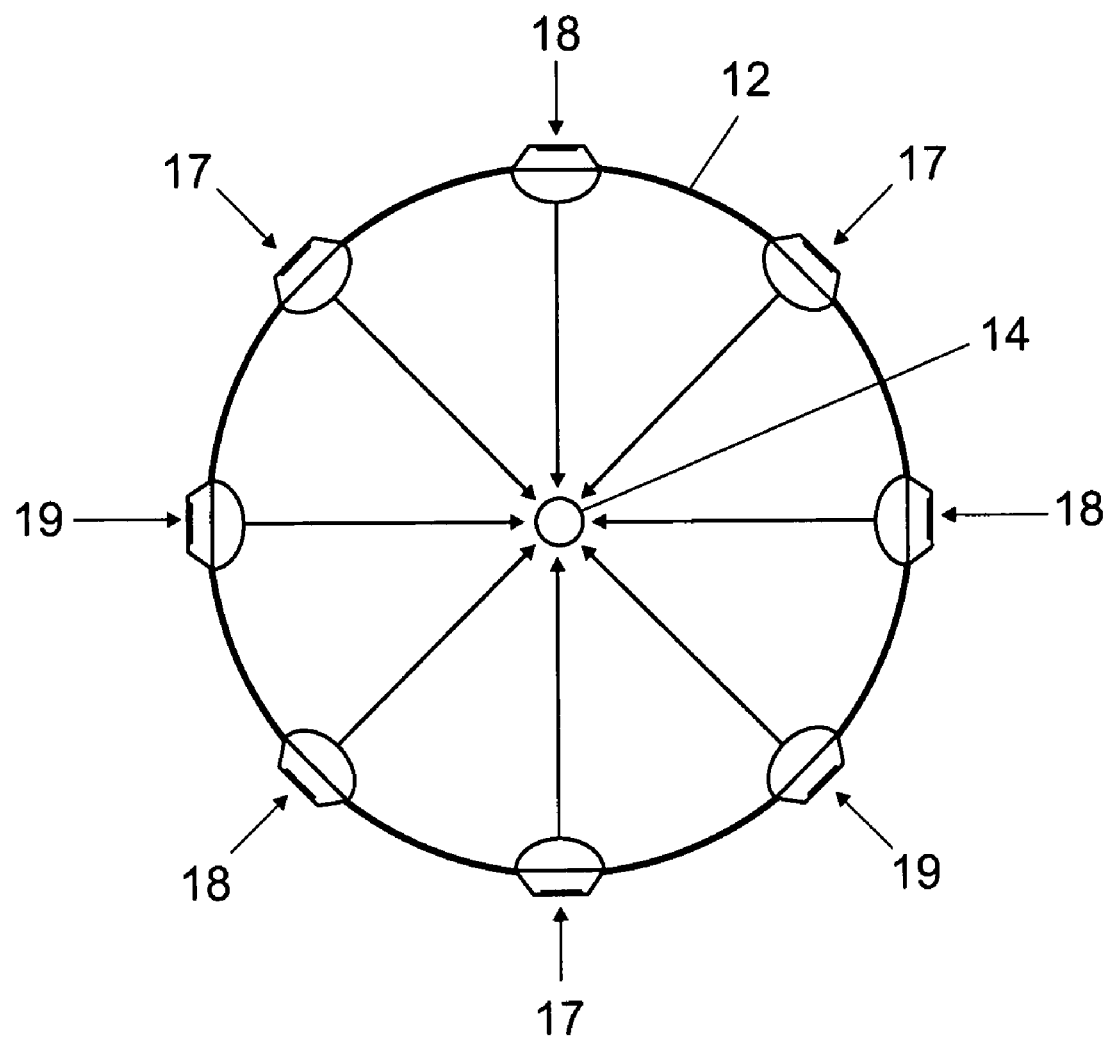
FIG. 5 shows a reflector, in plan view.

FIG. 5 shows a reflector 12, in plan view. The LEDs, illustrated by way of example here as different groups 17, 18, 19 which can be driven differently, are distributed uniformly over the circumference of the reflector, with the result that the incident light on the drop is as homogeneous as possible. The LEDs are alternatively arranged such that they are distributed uniformly in several rings over the circumference of the reflector. They therefore ensure even better homogeneous illumination of the diffusing drop.

Figure 6:
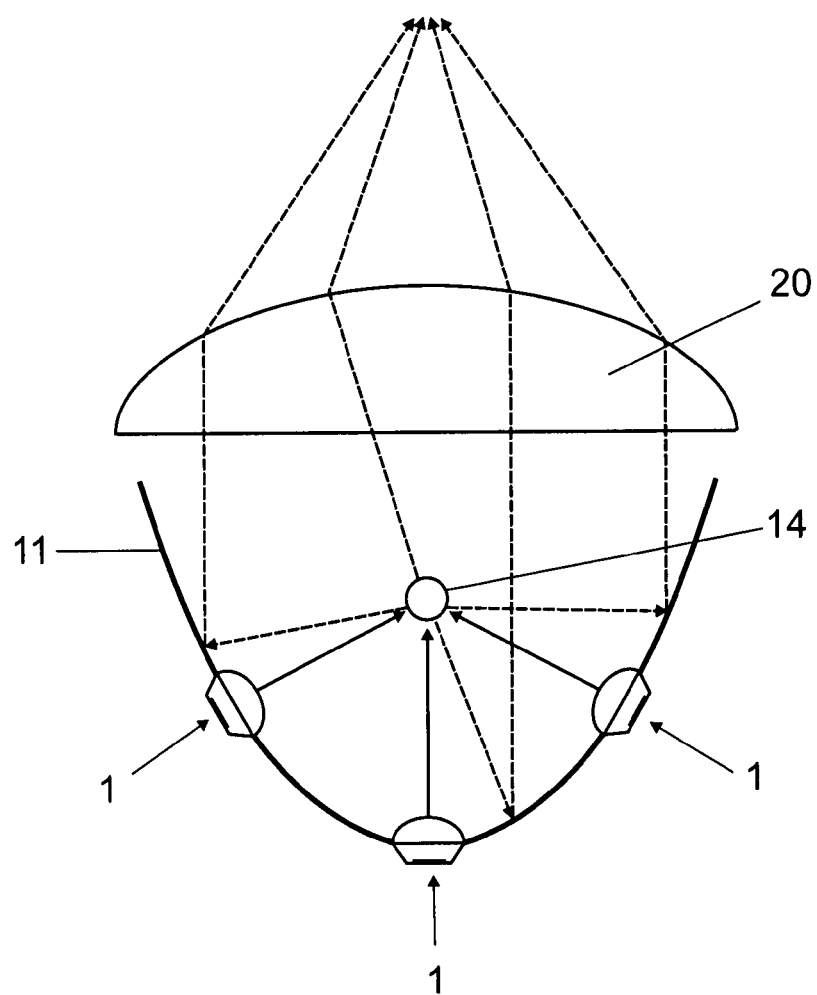
FIG. 6 shows the beam path in the reflector.

FIG. 6 shows, in cross section, how the light from the reflector 11 is emitted. Coming from the LEDs, it is diffused isotropically in the diffusing drop 14 and emitted. A condenser 20 may be positioned in front of the reflector and images the light onto one point. It is also possible for the light to be injected into a fiberoptic conductor.

In addition to simple LEDs, laser diodes or miniature lamps are naturally also suitable as the light source.

The diffusing medium may of course also be fixed mechanically in the reflector, for example by means of a wire or rod assembly, etc.

A free-form reflector, as is known per se, can also of course be used, in which case the shape of the diffusing drop does not have the form of a sphere but rather a distortion different from this which is matched to the reflector. The shape of the drop can also be optimized so as to implement a predetermined emission characteristic, together with the reflector, as is desired, for example, in motor vehicle headlights.

We claim:

1. An illumination system having at least one compact light source, the illumination system comprising:
   a reflector having a focal point and a reflector contour, the light source being disposed in the vicinity of the reflector contour; and
   a compact diffusing medium disposed at the focal point of the reflector,
   wherein the light from the light source is directed substantially onto the diffusing medium and, from there, is diffused onto the reflector contour, with the result that the light leaving the reflector is emitted homogeneously.

2. The illumination system as claimed in claim 1, wherein the light source comprises one or more groups of similar light sources.

3. The illumination system as claimed in claim 1, wherein the light sources are LEDs, laser diodes or miniature lamps.

4. The illumination system as claimed in claim 1, wherein the light source itself is colored, and in that the diffusing medium contains one or more phosphors for converting the light emitted by the light source.

5. The illumination system as claimed in claim 4, wherein the light source emits blue and is converted by the converting diffusing medium, with the result that the light leaving the reflector is white.

6. The illumination system as claimed in claim 1, wherein the compact diffusing medium has the shape of a sphere.

7. The illumination system as claimed in claim 1, wherein the compact diffusing medium contains an inert diffuser, in particular in the form of particles dispersed in cast resin, in particular $Al_2O_3$ or $TiO_2$.

8. The illumination system as claimed in claim 1, wherein the reflector is filled with a casting compound, the diffusing medium being placed in the casting compound.

9. The illumination system as claimed in claim 1, wherein the volume of the compact diffusing medium is less than 50 $mm^3$.

10. The illumination system as claimed in claim 9, wherein the volume of the compact diffusing medium is less than or equal to 10 $mm^3$.

11. The illumination system as claimed in claim 1, wherein the compact diffusing medium acts as a point light source in the reflector.

* * * * *